(12) United States Patent
Bruls

(10) Patent No.: US 12,131,435 B2
(45) Date of Patent: Oct. 29, 2024

(54) GENERATING AND PROCESSING AN IMAGE PROPERTY PIXEL STRUCTURE

(71) Applicant: KONINKLIJKE PHILIPS N.V., Eindhoven (NL)

(72) Inventor: Wilhelmus Hendrikus Alfonsus Bruls, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 623 days.

(21) Appl. No.: 17/424,909

(22) PCT Filed: Jan. 16, 2020

(86) PCT No.: PCT/EP2020/051072
§ 371 (c)(1),
(2) Date: Jul. 22, 2021

(87) PCT Pub. No.: WO2020/152033
PCT Pub. Date: Jul. 30, 2020

(65) Prior Publication Data
US 2022/0122216 A1   Apr. 21, 2022

(30) Foreign Application Priority Data

Jan. 24, 2019 (EP) .................................. 19153580

(51) Int. Cl.
*G06K 9/00* (2022.01)
*G06T 3/12* (2024.01)
(Continued)

(52) U.S. Cl.
CPC ................ *G06T 3/12* (2024.01); *G06T 3/147* (2024.01); *H04N 13/111* (2018.05); *H04N 13/139* (2018.05)

(58) Field of Classification Search
CPC ........... G06T 3/12; G06T 3/147; G06T 3/073; H04N 13/111; H04N 13/139;
(Continued)

(56) References Cited

U.S. PATENT DOCUMENTS 10,834,399 B2   11/2020   Wang et al.
2017/0336705 A1  11/2017   Zhou et al.
(Continued)

FOREIGN PATENT DOCUMENTS

| CN | 106375760 A | 2/2017 |
|----|-------------|--------|
| GB | 2548358 A   | 9/2017 |

OTHER PUBLICATIONS

Chengjia et al "Octogonal Mapping Scheme for Panoramic Video Encoding" IEEE Transactions on Circuits and Systems for Video Technology, vol. 28, No. 9, Sep. 2018.
(Continued)

*Primary Examiner* — Andrew M Moyer

(57) ABSTRACT

The invention relates to an apparatus for generating or processing an image signal. A first image property pixel structure is a two-dimensional non-rectangular pixel structure representing a surface of a view sphere for the viewpoint. A second image property pixel structure is a two-dimensional rectangular pixel structure and is generated by a processor (305) to have a central region derived from a central region of the first image property pixel structure and at least a first corner region derived from a first border region of the first image property pixel structure. The first border region is a region proximal to one of an upper border and a lower border of the first image property pixel structure. The image signal is generated to include the second image property pixel structure and the image signal may be processed by a receiver to recover the first image property pixel structure.

20 Claims, 10 Drawing Sheets

(51) Int. Cl.
  *G06T 3/147*   (2024.01)
  *H04N 13/111*  (2018.01)
  *H04N 13/139*  (2018.01)

(58) Field of Classification Search
  CPC .. H04N 19/132; H04N 19/167; H04N 19/176; H04N 19/182; H04N 19/597; H04N 19/88; H04N 23/698
  See application file for complete search history.

(56) References Cited

U.S. PATENT DOCUMENTS

2019/0139296 A1*  5/2019  Lakshman .............. G06T 7/596
2019/0268599 A1*  8/2019  Hannuksela ........... G03B 37/00
2019/0379910 A1* 12/2019  Shen ..................... G06T 3/4038

OTHER PUBLICATIONS

Coding of Moving Pictures and Audio International Organization for Standardisation Final Draft International Standard Oct. 2017.
"Equirectangular Projection" Wikipedia Downloaded Jul. 15, 2021.
"Cube Mapping" Wikipedia Downloaded Jul. 15, 2021.
"Bringing Pixels Front and Center in VR Video" Mar. 14, 2017 Google Blog.
International Search Report and Written Opinion From PCT/EP2020/051072 Mailed on Jul. 30, 2020.

* cited by examiner

GENERATING AND PROCESSING AN IMAGE PROPERTY PIXEL STRUCTURE

CROSS-REFERENCE TO PRIOR APPLICATIONS

This application is the U.S. National Phase application under 35 U.S.C. § 371 of International Application No. PCT/EP2020/051072, filed on Jan. 16, 2020, which claims the benefit of EP Patent Application No. EP 19153580.6, filed on Jan. 24, 2019. These applications are hereby incorporated by reference herein.

FIELD OF THE INVENTION

The invention relates to an apparatus and method for generating and/or processing an image property pixel structure and in particular, but not exclusively, to generation and/or processing of a rectangular pixel structure representing depth or light intensity for a scene.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to e.g. (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Typically, virtual reality applications are inherently limited in that they are based on a predetermined model of the scene, and typically on an artificial model of a virtual world. It is often desirable for a virtual reality experience to be provided based on real world capture. However, in many cases such an approach is restricted or tends to require that a virtual model of the real world is built from the real world captures. The virtual reality experience is then generated by evaluating this model.

However, the current approaches tend to be suboptimal and tend to often have a high computational or communication resource requirement and/or provide a suboptimal user experience with e.g. reduced quality or restricted freedom.

In many e.g. virtual reality applications a scene may be represented by an image representation, such as e.g. by one or more images representing specific view poses for the scene. In some cases, such images may provide a wide-angle view of the scene and may cover e.g. a full 360° view or cover a full view sphere.

In many applications, and specifically for virtual reality applications, an image data stream is generated from data representing the scene such that the image data stream reflects the user's (virtual) position in the scene. Such an image data stream is typically generated dynamically and in real time such that it reflects the user's movement within the virtual scene. The image data stream may be provided to a renderer which renders images to the user from the image data of the image data stream. In many applications, the provision of the image data stream to the renderer is via a bandwidth limited communication link. For example, the image data stream may be generated by a remote server and transmitted to the rendering device e.g. over a communication network. However, for most such applications it is important to maintain a reasonable data rate to allow efficient communication.

It has been proposed to provide a virtual reality experience based on 360° video streaming where a full 360° view of a scene is provided by a server for a given viewer position thereby allowing the client to generate views for different directions. Specifically, one of the promising applications of virtual reality (VR) is omnidirectional video (e.g. VR360 or VR180). The approach tends to result in a high data rate and therefore the number of view points for which a full 360° view sphere is provided is typically limited to a low number.

As a specific example, virtual reality glasses have entered the market. These glasses allow viewers to experience captured 360 degree (panoramic) video. These 360 degree videos are often pre-captured using camera rigs where individual images are stitched together into a single spherical mapping. In some such embodiments, images representing a full spherical view from a given viewpoint may be generated and transmitted to a driver which is arranged to generate images for the glasses corresponding to the current view of the user.

In many applications, a scene may be represented by a single view sphere image possibly with associated depth. The appropriate images for the current viewer pose may then be generated by selecting appropriate parts of the full image. Further, for sufficiently small changes in the position of the viewer, the depth information may be used to generated corresponding images using view shifting algorithms and techniques.

A critical consideration for such systems and applications is the image format and how to effectively represent the large views. For example, a full spherical view represented by a reasonably high resolution results in a high data requirement.

As the number of view points for which full (or partial) spherical information is preferably kept low (often with data being provide for only a few, or even only one viewpoint), the changes in pose from the optimal pose if often relatively limited before quality degradations become visible. A particularly attractive application for the approach is an application, such as immersive video, where small pose changes are supported whereas larger changes are not. For example, a video service may be provided which presents a scene to a user with correct stereo cues (e.g. parallax) being provided for the user rotating his head or making small head movements but not for the user substantially moving position. Such an application may provide a highly advantageous user experience in many situations yet be based on a relatively low amount of data being provided (compared to if free movement in the scene must be supported). As a specific example, it may provide a very immersive experience of a sports even where the viewer may have an experience resembling that of being a spectator in a seat at the event.

A very important issue for systems based on such image or video data is how to provide an efficient representation of the view data from a given view point, and specifically how the view spheres are represented.

One common format used to represent such view spheres is known as a cube map format (see e.g. https://en.wikipedia.org/wiki/Cube_mapping). In this format six images form a cube around a view position. The view sphere is then projected on to the sides of the cube with each side then providing a flat and square (part) image. Another common format is known as an ERP format where the surface of the view sphere is projected onto a rectangular image using an equirectangular projection (see e.g. https://en.wikipedia.org/wiki/Equirectangular_projection).

However, a disadvantage of these formats is that they tend to be relatively inefficient and require a relatively high amount of data to be represented. For example, if the view sphere is divided into pixels with a uniform resolution and the same resolution is considered a minimum resolution for the ERP/cube map format representations, these will require 50% more pixels than required for the sphere. Thus, a substantial increase in the required number of pixels results. The currently used formats tend to be suboptimal in terms of required data rate/capacity, complexity etc. and tend to lead to suboptimal systems using these formats.

Hence, an improved approach would be advantageous. In particular, a system and/or image property format that allows improved operation, increased flexibility, an improved virtual reality experience, reduced data rates, increased efficiency, facilitated distribution, reduced complexity, facilitated implementation, reduced storage requirements, increased image quality, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating an image property pixel structure representing a property of a scene from a viewpoint, the apparatus comprising: a first processor providing a first image property pixel structure being a two-dimensional non-rectangular pixel structure representing at least part of a surface of a view sphere for the viewpoint; and a second processor for generating a second image property pixel structure being a two dimensional rectangular pixel structure and having a central region derived from a central region of the first image property pixel structure and at least a first corner region derived from a first border region of the first image property pixel structure, the first border region being a region proximal to one of an upper border and a lower border of the first image property pixel structure, the at least one corner section being non-overlapping with the central region of the second image property pixel structure; wherein the central region of the first image property pixel structure is restricted by at least one of an upper horizontal line corresponding to an upper edge of the second image property pixel structure and a lower horizontal line corresponding to a lower edge of the second image property pixel structure; and the first border region of the first image property pixel structure is more peripheral than the at least one of the upper horizontal line and the lower horizontal line.

The invention may provide an improved representation of a scene. In many embodiments, a more efficient representation of a scene can be provided, e.g. allowing a given quality to be achieved by a reduced data rate. The approach may provide an improved rectangular image property pixel structure that is suitable for processing by many conventional processes, operations, and algorithms designed for rectangular images. Specifically, the second image property pixel structure may be suitable for encoding using many known encoding algorithms, including many standardized video or image encoding algorithms.

The approach may in many embodiments provide an image property pixel representation of a scene suitable for a flexible, efficient, and high performance Virtual Reality (VR) applications. In many embodiments, it may allow or enable a VR application with a substantially improved trade-off between image quality and data rate. In many embodiments, it may allow an improved perceived image quality and/or a reduced data rate.

The approach may be particularly suited to e.g. broadcast video services supporting adaptation to movement and head rotation at the receiving end.

A point (pixel) on a view sphere for a given viewpoint may have a value reflecting a value of the image property (typically light intensity, depth, transparency) of a first encountered scene object in a direction of a ray with origin at the view sphere and intersecting the view sphere at the point. It will be appreciated that this in principle is independent of the size of the view sphere as a point has no extension. Further, for a pixelated view sphere, the pixel values depend only on the size of the pixels and thus for uniform resolution it depends only on the number of pixels the view sphere is divided into and not on the size of the view sphere itself.

An image property pixel structure may in many embodiments be a regular grid of pixels filling out a shape with each pixel representing a value for the image property. The shape for the first image property pixel structure is non/rectangular and the shape for the second image property pixel structure is rectangular.

An image property pixel structure may specifically be an image or a map, such as for example a light intensity image, a depth map, and/or a transparency map. An image property may be a depth property, a transparency property, or a light intensity property (such as e.g. a color channel value).

The first image property pixel structure may be an equal-area projection of the at least part of the surface onto a plane. An equal-area projection may be a projection which maintains proportions of areas of regions, such as pixel areas, between the surface of the view sphere and the plane on which the surface is projected.

The first image property pixel structure may be a sinusoidal projection of the at least part of the surface.

The second processor may be arranged to generate the second image property pixel structure by applying pixel position mapping between the first image property pixel structure and the second image property pixel structure. The mapping may be different for the central region and (each of) the border regions.

In accordance with an optional feature of the invention, the first image property pixel structure has a uniform resolution for the at least part of the surface.

This may provide advantageous representation and operation in many embodiments.

In accordance with an optional feature of the invention, the central region of the image property pixel structure and the first border region are non-overlapping.

This may provide advantageous representation and operation in many embodiments. It may in many embodiments allow a particularly efficient representation and specifically reduce the required data rate for a given quality.

Each pixel of the first image property pixel structure may only belong to one region of the central region and the border region(s). Each pixel of the second image property pixel structure may only belong to one region of the central region and the corner region(s).

In accordance with an optional feature of the invention, the second processor is arranged to generate the second image property pixel structure to have a second corner region derived from a second border region of the first image property pixel structure, the second corner region being non-overlapping with the central region of the second image property pixel structure, the second border region being a region proximal to the one of the upper border and the lower border, and the first border region and the second border region being on different sides of a virtual vertical line of the first image property pixel structure.

This may provide advantageous representation and operation in many embodiments. It may in many embodiments allow a particularly efficient representation and specifically reduce the required data rate for a given quality. The virtual vertical line may be any vertical line overlaid the first image property pixel structure. The virtual vertical line may be any vertical line dividing the first image property pixel structure into a left region and right region.

The virtual vertical line may be a center line

In accordance with an optional feature of the invention, the virtual vertical line separates the first border region and the second border region, and the first border region and the second border region are mirror symmetric around the virtual vertical line.

This may be particularly advantageous in many embodiments.

In accordance with an optional feature of the invention, a horizontal direction from the first border region to the second border region is opposite a horizontal direction from the first corner region to the second corner region.

This may be particularly advantageous in many embodiments. It may in many embodiments provide an improved and/or closer fit between the central regions and the border regions when positioned in the corner regions. If the horizontal direction from the first border region to the second border region is from the left to the right, the horizontal direction from the first corner region to the second corner region may be from the right to the left, and vice versa.

In accordance with an optional feature of the invention, the first corner region is proximal to an opposite border of the first border region.

This may be particularly advantageous in many embodiments. In many embodiments, if the first border region is closer to the upper border (i.e. it is in the upper half) of the first image property pixel structure then the first corner region will be closer to the lower border of the (i.e. it is in the lower half) of the second image property pixel structure, and vice versa.

In some embodiments, a horizontal pixel order for the first vertical border region is opposite a horizontal pixel order for the first corner region.

In accordance with an optional feature of the invention, the second processor is arranged to extrapolate pixels of at least one of the first corner region and the central region of the second image property pixel structure into an unfilled region of the second image property pixel structure proximal to at least one of the first corner region and the central region.

This may provide a more efficient representation in many embodiments and may specifically improve encoding efficiency when encoding the second image property pixel structure.

In accordance with an optional feature of the invention, the second processor is arranged to determine pixel values of the first corner region by at least one of a shifting, translation, mirroring and rotation of pixel values of the first border region.

This may be particularly advantageous in many embodiments.

In accordance with an optional feature of the invention, the first processor is arranged to generate the first image property pixel structure by warping of a rectangular image property pixel structure representing the at least part of the surface by an equirectangular projection.

This may be particularly advantageous in many embodiments.

According to an aspect of the invention there is provided an apparatus for generating an output image property pixel structure, the apparatus comprising: a receiver for receiving an image signal comprising a second image property pixel structure being a two dimensional rectangular pixel structure and having a central region derived from a central region of a first image property pixel structure and at least a first corner region derived from a first border region of the first image property pixel structure, first image property pixel structure being a two-dimensional non-rectangular pixel structure representing at least part of a surface of a view sphere for the viewpoint, and the first border region being a region proximal to one of an upper border and a lower border of the first image property pixel structure, the at least one corner section being non-overlapping with the central region of the second image property pixel structure, the central region of the first image property pixel structure being restricted by at least one of an upper horizontal line corresponding to an upper edge of the second image property pixel structure and a lower horizontal line corresponding to a lower edge of the second image property pixel structure; and the first border region of the first image property pixel structure being more peripheral than the at least one of the upper horizontal line and the lower horizontal, and a processor for generating a non-rectangular output image property pixel structure representing the at least part of the surface of the view sphere for the viewpoint, the non-rectangular output image property pixel structure having central region derived from the central region of the second image property pixel structure and a border region being a region proximal to one of an upper border and a lower border of the output image property pixel structure derived from the first corner region of the second image property pixel structure.

According to an aspect of the invention there is provided a method of generating an image property pixel structure representing a property of a scene from a viewpoint, the method comprising: providing a first image property pixel structure being a two-dimensional non-rectangular pixel structure representing at least part of a surface of a view sphere for the viewpoint; and generating a second image property pixel structure being a two dimensional rectangular pixel structure and having a central region derived from a central region of the first image property pixel structure and at least a first corner region derived from a first border region of the first image property pixel structure, the first border region being a region proximal to one of an upper border and a lower border of the first image property pixel structure, the at least one corner section being non-overlapping with the central region of the second image property pixel structure; wherein the central region of the first image property pixel structure is restricted by at least one of an upper horizontal line corresponding to an upper edge of the second image property pixel structure and a lower horizontal line corresponding to a lower edge of the second image property pixel structure; and the first border region of the first image property pixel structure is more peripheral than the at least one of the upper horizontal line and the lower horizontal line.

According to an aspect of the invention there is provided a method for generating an output image property pixel structure, the method comprising: receiving an image signal comprising a second image property pixel structure being a two dimensional rectangular pixel structure and having a central region derived from a central region of a first image property pixel structure and at least a first corner region derived from a first border region of the first image property pixel structure, first image property pixel structure being a two-dimensional non-rectangular pixel structure representing at least part of a surface of a view sphere for the viewpoint, and the first border region being a region proximal to one of an upper border and a lower border of the first image property pixel structure, the at least one corner section being non-overlapping with the central region of the second image property pixel structure, the central region of the first image property pixel structure being restricted by at least one of an upper horizontal line corresponding to an upper edge of the second image property pixel structure and a lower horizontal line corresponding to a lower edge of the second image property pixel structure; and the first border region of the first image property pixel structure being more peripheral than the at least one of the upper horizontal line and the lower horizontal, generating a non-rectangular output image property pixel structure representing the at least part of the surface of the view sphere for the viewpoint, the non-rectangular output image property pixel structure having central region derived from the central region of the second image property pixel structure and a border region being a region proximal to one of an upper border and a lower border of the output image property pixel structure derived from the first corner region of the second image property pixel structure.

According to an aspect of the invention there is provided an image signal comprising a second image property pixel structure being a two dimensional rectangular pixel structure and having a central region derived from a central region of a first image property pixel structure and at least a first corner region derived from a first border region of the first image property pixel structure, first image property pixel structure being a two-dimensional non-rectangular pixel structure representing at least part of a surface of a view sphere for the viewpoint, and the first border region being a region proximal to one of an upper border and a lower border of the first image property pixel structure, the at least one corner section being non-overlapping with the central region of the second image property pixel structure.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
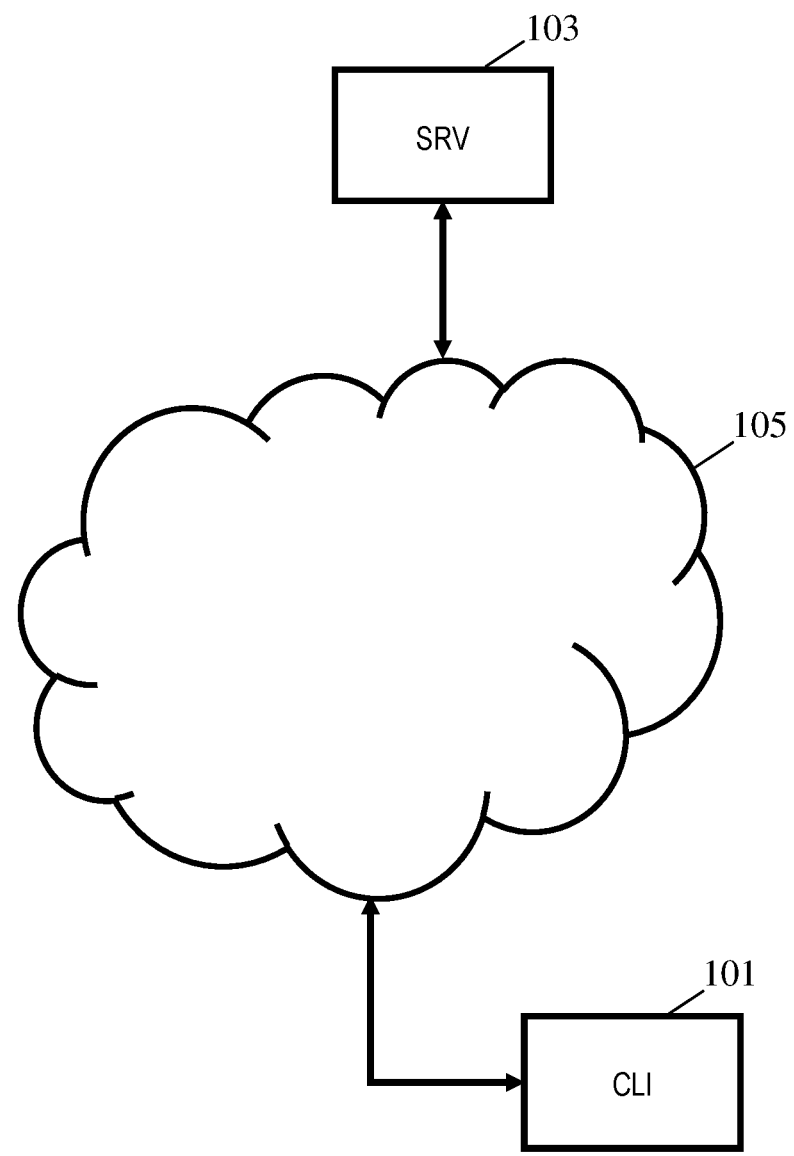
FIG. 1 illustrates an example of an arrangement for providing a virtual reality experience.

Virtual experiences allowing a user to move around in a virtual world are becoming increasingly popular and services are being developed to satisfy such a demand. However, provision of efficient virtual reality services is very challenging, in particular if the experience is to be based on a capture of a real-world environment rather than on a fully virtually generated artificial world.

In many virtual reality applications, a viewer pose input is determined reflecting the pose of a virtual viewer in the scene. The virtual reality apparatus/system/application then generates one or more images corresponding to the views and viewports of the scene for a viewer corresponding to the viewer pose.

Typically, the virtual reality application generates a three-dimensional output in the form of separate view images for the left and the right eyes. These may then be presented to the user by suitable means, such as typically individual left and right eye displays of a VR headset. In other embodiments, the image may e.g. be presented on an autostereoscopic display (in which case a larger number of view images may be generated for the viewer pose), or indeed in some embodiments only a single two-dimensional image may be generated (e.g. using a conventional two-dimensional display).

The viewer pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the movement of the VR headset.

In some systems, the viewer pose may be provided by manual means, e.g. by the user manually controlling a joystick or similar manual input. For example, the user may manually move the virtual viewer around in the scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

The generation of images is based on a suitable representation of the virtual world/environment/scene. In some applications, a full three-dimensional model may be provided for the scene and the views of the scene from a specific viewer pose can be determined by evaluating this model. In other systems, the scene may be represented by image data corresponding to views captured from different capture poses. For example, for one or more capture poses, a full spherical image may be stored together with three dimensional (depth data). In such approaches, view images for other poses than the capture pose(s) may be generated by three dimensional image processing, such as specifically using view shifting algorithms. In systems where the scene is described/referenced by view data stored for discrete view points/positions/poses, these may also be referred to as anchor view points/positions/poses. Typically when a real world environment has been captured by capturing images from different points/positions/poses, these capture points/positions/poses are also the anchor points/positions/poses.

A typical VR application accordingly provides (at least) images corresponding to viewports for the scene for the current viewer pose with the images being dynamically updated to reflect changes in the viewer pose and with the images being generated based on data representing the virtual scene/environment/world.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A pose may be at least one of an orientation and a position. A pose value may be indicative of at least one of an orientation value and a position value.

A system or entity based on providing the maximum degree of freedom for the viewer is typically referred to as having 6 Degrees of Freedom (6DoF). Many systems and entities provide only an orientation or position and these are typically known as having 3 Degrees of Freedom (3DoF).

In some systems, the VR application may be provided locally to a viewer by e.g. a stand alone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images for the viewer pose based on scene data describing the scene data. The view images are then transmitted to the device local to the viewer where they are presented. For example, the remote device may directly generate a video stream (typically a stereo/3D video stream) which is directly presented by the local device. Thus, in such an example, the local device may not perform any VR processing except for transmitting movement data and presenting received video data.

In many systems, the functionality may be distributed across a local device and remote device. For example, the local device may process received input and sensor data to generate viewer poses that are continuously transmitted to the remote VR device. The remote VR device may then generate the corresponding view images and transmit these to the local device for presentation. In other systems, the remote VR device may not directly generate the view images but may select relevant scene data and transmit this to the local device which may then generate the view images that are presented. For example, the remote VR device may identify the closest capture point and extract the corresponding scene data (e.g. spherical image and depth data from the capture point) and transmit this to the local device. The local device may then process the received scene data to generate the images for the specific, current view pose. The view pose will typically correspond to the head pose, and references to the view pose may typically equivalently be considered to correspond to the references to the head pose.

In many applications, especially for broadcast services, a source may transmit scene data in the form of an image (including video) representation of the scene which is independent of the viewer pose. For example, an image representation for a single view sphere for a single capture position may be transmitted to a plurality of clients. The individual clients may then locally synthesize view images corresponding to the current viewer pose.

A particular application which is attracting particular interest is where a limited amount of movement is supported such that the presented views are updated to follow small movements and rotations corresponding to a substantially static viewer making only small head movements and rotations of the head. For example, a viewer sitting down can turn his head and move it slightly with the presented views/images being adapted to follow these pose changes.

Such an approach may provide a highly and immersive e.g. video experience. For example, a viewer watching a sports event may feel that he is present at a particular spot in the arena.

Such limited freedom applications have the advantage of providing an improved experience while not requiring an accurate representation of a scene from many different positions thereby substantially reducing the capture requirements. Similarly, the amount of data that needs to be provided to a renderer can be reduced substantially. Indeed, in many scenarios, only image and typically depth data for a single viewpoint need to be provided with the local renderer being able to generate the desired views from this. In order to support head rotations, it is typically desired that a large area of the view from the viewpoint is represented by the provided data, and preferably the whole surface of a view sphere centered on the view point is covered by the provided image and depth data.

The approach may specifically be highly suitable for applications where the data needs to be communicated from a source to a destination over a bandlimited communication channel, such as for example for a broadcast or client server application.

FIG. 1 illustrates such an example of a VR system in which a remote VR client device 101 liaises with a VR server 103 e.g. via a network 105, such as the Internet. The server 103 may be arranged to simultaneously support a potentially large number of client devices 101.

The VR server 103 may for example support a broadcast experience by transmitting image data and depth for a specific viewpoint with the client devices then being arranged to process this information to locally synthesize view images corresponding to the current pose.

Thus, many applications are based on transmitting image information for a view position which corresponds to view ports that are much larger than the conventional small view ports provide a relatively narrow left and right eye image. In particular, it is desirable in many applications to communicate image property information (e.g. light intensity and depth) for the entire view sphere of one or more view/capture positions. For example, in VR360 video applications, light intensity and depth values are transmitted for the entire view sphere. However, a critical issue for such applications is how to represent the information such that in particular efficient communication can be achieved.

It is for example desirable that existing algorithms and functions for encoding and formatting image property information can be used. However, such functions tend to almost exclusively be designed for planar rectangular image formats whereas the surface of a three dimensional surface inherently does not correspond to a two dimensional rectangle. In order to address this, many approaches use a cube map format where a cube is positioned around the view sphere with the surface of the sphere then being projected onto the square sides of the cube. Each of these is planar and can accordingly be processed by conventional techniques. However, a disadvantage is that if the resolution of the cube map is the same as the resolution of the view sphere at the point where the cube map touches the view sphere (in order to not cause any resolution loss), then a much large number of pixels is required for the cube map than for the view sphere (the projection of the view sphere onto the outer areas of each side results in each view sphere pixel being projected onto areas larger than a single pixel (and specifically to areas potentially corresponding to a relatively large number of pixels). It can be shown that around 50% more pixels of a given uniform size are required for a cube map representation compared to a spherical representation.

Figure 2:
FIG. 2 illustrates an example of an ERP projection of spherical image for a view sphere.

Another format that is frequently used is to project the surface of the scene onto a two dimensional rectangle using an equirectangular projection (ERP). An example of such an image is shown in FIG. 2. As can be seen the distortion caused by the projection also substantially increases the resulting projected area of some regions with respect to other regions (specifically the projected area increases towards the vertical edges reflecting that the single point above (or below) the view pose is stretched over the entire width of the rectangle). Thus, the required number of pixels (of a constant size) required without reducing resolution in the center will increase substantially. It can be shown that around 50% more pixels of a given uniform size are also required for an ERP representation compared to a spherical representation.

This increased pixel count results in an increased complexity of the processing and an increased data requirement. Specifically, a higher data rate may be required to transmit the image information.

Figure 3:
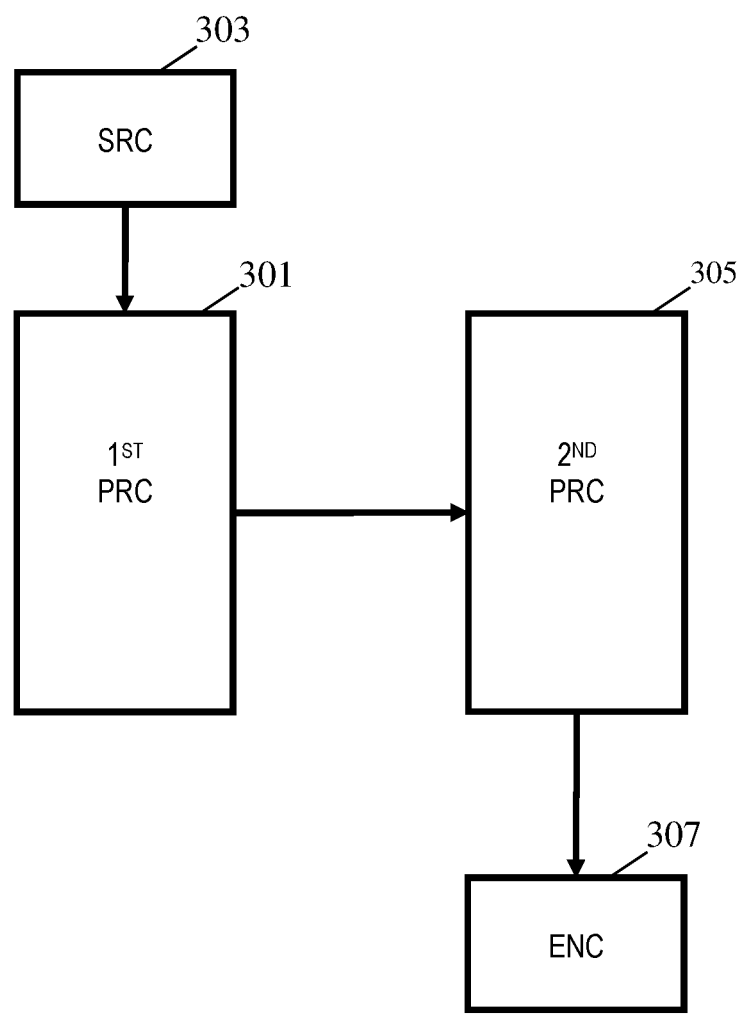
FIG. 3 illustrates an example of elements of an apparatus in accordance with some embodiments of the invention.

FIG. 3 illustrates elements of an apparatus that may generate representations of (at least part of) the surface of a view sphere.

The apparatus comprises a first processor 301 which is arranged to provide a first image property pixel structure being a two-dimensional (flat, Euclidian) non-rectangular pixel structure representing at least part of a surface of a view sphere for a viewpoint/view position. In the following example, the first processor 301 is arranged to process both a (light intensity image) and a depth map, and the first image property pixel structure may be considered to correspond to the image or the depth map, or indeed simultaneously to both (with pixel values being a combination of the image pixel values and depth map pixel values).

In the example, the first processor 301 is coupled to a source 303 for the first image property pixel structure and specifically the source may provide the input image and depth map. The source 303 may specifically be a local memory storing the image information or it may e.g. be a suitable capture unit such as a full spherical camera and/or depth sensor.

The view sphere for a viewpoint is a (nominal) sphere surrounding the viewpoint with each point of the surface representing the image property value for the scene in the direction from the view point through point on the surface. For light intensity image property value, the value of a point of the surface corresponds to the light intensity of the ray reaching the viewpoint from the direction of the point. Correspondingly, for a depth or range image property value, the depth value for a given point of the surface of the view sphere corresponds to the distance from the view point to the first object of the scene in the direction from the viewpoint to (through) the point on the surface.

The first image property pixel structure represents an image property being a property representing a property of the scene that may be used by an image rendering process to generate view images for specific Thus, the image property may be a property capable of supporting an image generation/synthesis function for generating an image of the scene (for one or more viewports, e.g. corresponding to different view poses). The image property may specifically be at least one property of: a light intensity property, a depth property, or a transparency property.

The image property may in some embodiments be a combined property, for example an image property may comprise a plurality of color channel light intensity values (e.g. a Red, Green, and Blue value), and possibly also a depth value. For example, each pixel of the first image property pixel structure may comprise multiple values for each value, or the pixel value may be a multicomponent vector value. Equivalently, the first processor 301 may be considered to provide a plurality single value image property pixel structures with each of these being processed as will be described in the following.

The following description will focus on the properties of a light intensity and depth. Accordingly, the image property pixel structure(s) will for brevity and clarity also be referred to by more common terminology of respectively (light intensity) images and depth maps.

The image property pixel structure may specifically be a planar area or region which is divided into a plurality of pixels. Each pixel comprises one or more values which is indicative of a value of the image property for the area covered by the pixel. Typically, the pixels all have the same size, i.e. the resolution is uniform. Typically, the pixels are square, or at least rectangular and are arranged in an equidistant grid. Thus, a conventional image or depth map are examples of image property pixel structures.

However, the first image property pixel structure is not a rectangular image property pixel structure but rather is a two-dimensional non-rectangular pixel structure. The first image property pixel structure further represents at least part of the surface of the view sphere and often the entire surface of the view sphere. As the surface of a sphere has a three dimensional curved property, the corresponding flat representation will generally not be rectangular.

Figure 4:
FIG. 4 illustrates an example of a sine projection of spherical image for a view sphere.

Specifically, the surface of the sphere may be considered to be divided into a given number of equal area pixels with the area covered by a pixel typically being (substantially) a square. If these pixels are instead rearranged on a flat plane, the resulting area covered will not be rectangular or quadratic. Specifically, the resulting area for square pixels is illustrated in FIG. 4.

In this case, the first image property pixel structure may specifically be a sinusoidal projection of the surface of the view sphere. The area covered by the first image property pixel structure for the full surface is as shown in FIG. 4. As shown, the view sphere surface is represented as an area where the width/horizontal extension is a sine function of the vertical position, with the vertical position being represented by a value in the range from 0 to $\pi$ (180°) with the central vertical position corresponding to $\pi/2$ (90°). In the example, the vertical position of 0 and $\pi$ (180°) thus correspond to the direction directly down and up from the viewpoint and the vertical position of $\pi/2$ (90°) corresponds to a horizontal direction from the viewpoint.

It will be appreciated that in some embodiments, only a part of the surface of a view sphere may be represented by the first image property pixel structure. For example, in some embodiments, the first image property pixel structure may only represent a half sphere such as the upper half sphere (e.g. corresponding to a camera being positioned at ground level and capturing only the scene above ground level) or only the half sphere in a given direction (e.g. for a user only looking in one general direction). In such examples, the first image property pixel structure will also be non-rectangular but will not correspond directly to the example of FIG. 4. The first image property pixel structure may in some embodiments still be a sinusoidal projection but may only be a projection of part of the surface. For example, the resulting first image property pixel structure for a semi-sphere may correspond to only the upper half or the left (or right) half of FIG. 4.

The first image property pixel structure is thus a non-rectangular structure and as such is not suitable for processing in many existing processes, including for example in image or video encoders. It further tends to be inconsistent with many existing standards and formats which are based on rectangular image representations. Therefore, it is desirable to convert the non-rectangular first image property pixel structure into a second image property pixel structure which is rectangular. As mentioned, this is conventionally typically done by projection the surface of the sphere onto a rectangle using an ERP or onto the sides of a cube (cube map representation).

However, in contrast, the apparatus of FIG. 3 comprises a second processor 305 which is arranged to generate a second image property pixel structure being a two dimensional rectangular pixel structure using an approach that leads to a more efficient structure and specifically one which is capably of maintaining resolution without requiring a significant increase in the number of required pixels.

The output of the second processor 305 is accordingly a rectangular image structure, and specifically may be a rectangular image and/or depth map. This second image property pixel structure may be fed to an output generator 307 which is arranged to generate an image signal in the form of an output data stream that can be transmitted to remote devices. Specifically, the output generator 307 may be arranged to encode the second image property pixel structure using techniques designed for rectangular images and to include the encoded data in an output data stream. For example, image or video encoding may be applied to rectangular images provided by the second processor 305 in order to generate a corresponding encoded video data stream which may be transmitted to remote clients.

The second processor 305 is specifically arranged to determine different regions in the first image property pixel structure and to position these regions differently and separately in the rectangular region of the second image property pixel structure. Specifically, it is arranged to derive a central region of the second image property pixel structure from a central region of the first image property pixel structure. It may further derive one or more corner regions from one or more border regions in the vertical direction, and specifically one or more border regions which is close to the upper or lower edge/border of the first image property pixel structure. Thus, in the approach, the second processor 305 may populate a center region of a rectangular output image based on image data of a central region of a non-rectangular image and populate the corner region(s) from image data of outer region(s) of the input image in the vertical direction (close to the top or bottom of the input image). An example of the approach by the second processor 305 may be illustrated with reference to FIGS. 5-7 where FIGS. 6 and 7 show examples of specific images corresponding to FIG. 3 where the principle of FIG. 5 has been applied.

In the example, a first image property pixel structure in the form of an image represents the surface of a view sphere by a sinusoidal projection and thus corresponds to flat region 501 corresponding to shape formed by half of a sine wave period and its mirror image as shown. In the example, four border regions are determined, namely an upper left region p1, an upper right region p2, a lower left region p3, and a lower right region p4.

The second processor 305 then generates a second image property pixel structure corresponding to a rectangular image. This image thus corresponds to a rectangular region 503. This image is generated by maintaining the central section of the input image and moving the border regions p1-p4 diagonally to the opposite corners. In the example, the input image has a dimension of W by H0 whereas the output image may have a reduced height of H.

Figure 6:
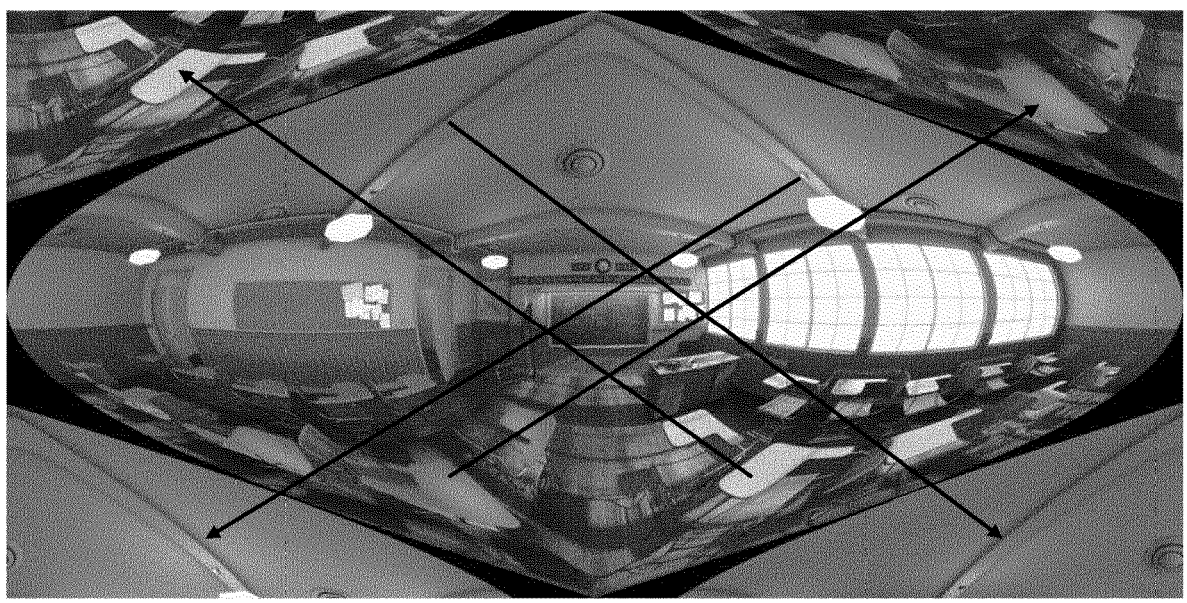
FIG. 6 illustrates an example of a mapping from a sine projection of spherical image for a view sphere to a rectangular image representing the view sphere in accordance with some embodiments of the invention.
Figure 7:
FIG. 7 illustrates an example of a rectangular image representing a view sphere in accordance with some embodiments of the invention.

FIG. 6 illustrates and example of how a rectangular intermediate image with the same height and width as the input image of FIG. 4 may first be generated by copying the border regions to the corner regions of the intermediate image. This image may be substantially larger than the input image as it includes many redundant pixels. However, the output image may then be generated by a vertical cropping such that the height is reduced and redundant pixels are removed. Specifically, the height may be reduced to a level where the number of redundant pixels is minimized. Indeed, in many embodiments, the height may be reduced by cropping such that no redundant pixels are included.

The approach may provide a very efficient view sphere representation of a scene by a rectangular image. The approach is based on the Inventor's realization that the properties of a projection of a view sphere is suitable for division into different regions that can be tightly fitted within a rectangular area. Indeed, as can be seen from the examples of FIGS. 5, 6, and 7, it is possible to determine border regions that can fit tightly and closely into border regions. Indeed, as can be seen by the example of FIG. 7, a rectangular image can be generated which includes only few extra pixels (represented by black regions in FIG. 7). Indeed, it can be shown that in the example, a rectangular representation of the view sphere surface without any loss in resolution can be achieved with a pixel increase of only about 5%.

Thus, a much more efficient representation than an ERP or cube map representation can be achieved by the described approach.

In the above examples, the image property pixel structures have been (light intensity) images, but it will be appreciated that the approaches may be applied to other properties such as to depth or transparency maps. For example, the images of the examples above may be supplemented by e.g. a depth map and/or a transparency map which may provide respectively a depth value and a transparency value for each pixel of the image. These maps may then be processed in the same way as described for the light intensity images thereby resulting in square maps that are more suitable or e.g. encoding using conventional techniques.

In the example above, the second processor 305 is arranged to determine four border regions in the first image property pixel structure (p1, p2, p3, p4) where the border structures are close to either the upper border of the first image property pixel structure or to the lower border of the image property pixel structure. In the examples, the border regions are thus upper and lower border regions and specifically are (contiguous) regions for which part of their border are also a border of the first image property pixel structure itself.

The second processor 305 in the example identified a central region in the second image property pixel structure and populated this by the center region of the first image property pixel structure. Four corner regions of the second image property pixel structure are identified and these are then populated by the four border regions of the first image property pixel structure. Thus, effectively, the identified four border regions of the first image property pixel structure can be considered to be moved to the corner regions in the second image property pixel structure.

In the example, the central region of the first image property pixel structure which is used to populate the center region is restricted by an upper and a lower horizontal line which corresponds to the upper and lower edges of the second image property pixel structure. The border regions of the first image property pixel structure are more peripheral than these lines, i.e. they are respectively above and below the dividing horizontal lines. Accordingly, a positional mapping is applied to pixel positions of the central region of the first image property pixel structure to pixel positions in the central region of the second image property pixel structure. If the same pixel position mapping is applied to the border regions, it would result in positions falling outside the second image property pixel structure.

The second image property pixel structure is specifically a rectangular structure and it has an upper/top (horizontal) edge and a lower/bottom (horizontal) edge. The central region of the second image property pixel structure may be restricted by these edges, and the central region may in the second image property pixel structure stretch to the edge of the second image property pixel structure.

The upper edge of the second image property pixel structure may correspond to an upper/top horizontal line in the first image property pixel structure and the lower edge of the second image property pixel structure may correspond to an upper/top horizontal line in the first image property pixel structure.

The central region of the first image property pixel structure may be selected as the part of the first image property pixel structure which falls between these two horizontal lines.

One, more, and typically all of the border regions of the first image property pixel structure are regions that are more peripheral than at least one of the horizontal lines. Thus, a border region may be above the upper horizontal line or below the lower horizontal line.

In some embodiments, the described approach may potentially only be applied to the top or to the bottom of the first image property pixel structure, and thus in some embodiments only one of the upper and lower horizontal lines may be considered, or equivalently one of the upper and lower horizontal lines may be considered to correspond to an edge of the first image property pixel structure. However, in most embodiments, the approach will be applied symmetrically to the top and bottom sections of the first image property pixel structure. Also, in most embodiments, the approach will be applied symmetrically to the top and bottom sections of the first image property pixel structure.

In many embodiments, a plurality of border regions may be determined and allocated to corner regions in the second image property pixel structure. Each of these border regions may be more peripheral than the horizontal lines, i.e. may be above the upper horizontal line or below the horizontal line.

In many embodiments, the border regions may include all areas of the first image property pixel structure more peripheral/outlying/external/exterior than the horizontal lines. Thus, in some embodiments, all pixels above the upper horizontal line and below the lower horizontal line may be included in a border region.

The approach may specifically allow a second image property pixel structure to be generated which is smaller than the rectangular structure that would encompass the first image property pixel structure. The number of rows of the second image property pixel structure may be lower than the number of rows of the first image property pixel structure, and typically may be at least 5%, 10%, or 20% lower.

The height (vertical extension) of the second image property pixel structure may be substantially lower than the height (vertical extension) of the first image property pixel structure, and typically may be at least 5%, 10%, or 20% lower.

Further, this may typically be achieved while maintaining the number of columns/width/horizontal extension and thus the number of pixels required for a rectangular image may be reduced significantly.

In many embodiments, each border region may be a contiguous region comprising a relatively high number of pixels. In many embodiments, at least one border region may comprise no less than 1000, or even 5000 pixels. In many embodiments, the border regions may comprise no less than 5%, or 10% of the total number of pixels in the first image property pixel structure.

In some embodiments, encoding of the second image property pixel structure may use an encoding algorithm based on image blocks, such as Macro Blocks known from e.g. MPEG encoding. In such embodiments, each border region may comprise integer macro blocks, i.e. each border region may not comprise no parts of an encoding block. Further, in many embodiments, each border region may comprise a plurality of encoding blocks.

Each border region may be reallocated to a border region as a block, i.e. the relative position between pixels is unchanged.

In many embodiments each section may be a section extending to a corner of the second image property pixel structure. A border region may be included in the second image property pixel structure such that it abuts a corner of the second image property pixel structure. A border region may be included in the second image property pixel structure such that it has an edge in common with an edge of the second image property pixel structure, and possible has two edges in comment with the second image property pixel structure.

In many embodiments, a border region may be included in the second image property pixel structure such that there is a distance from the border region to the central region of the second image property pixel structure, i.e. there may be a guardband between these. Such a distance may e.g. be no less than 1, 2, 5, 10, or 50 pixels.

In many embodiments, a border region may be included in the second image property pixel structure such that pixels of the border region have different vertical positions in the second image property pixel structure than in the first image property pixel structure. The vertical position for pixels of a border region may specifically change from being more peripheral than a vertical position of the upper and/or lower vertical line, to be more central/less periphera than a vertical position of the upper and/or lower vertical line.

In the specific example, each border region is moved to a diagonal corner region, i.e. the upper left border region is moved to the lower right corner region; the upper right border region is moved to the lower left corner region; the lower left border region is moved to the upper right corner region; and the lower right border region is moved to the upper left corner region.

Thus, in the example, the horizontal relationship between two border regions in the first image property pixel structure and the two corner regions that these are mapped to in the second image property pixel structure are reversed. Thus, a first border region which is to the left of a second border region will be moved to a first corner region which is to the right of a second corner region to which the second border region is moved. In the approach, a horizontal direction from the first border region to the second border region is opposite a horizontal direction from the first corner region to the second corner region.

Similarly, in the example, the vertical relationship between two border regions in the first image property pixel structure and the two corner regions that these are mapped to in the second image property pixel structure are reversed. Thus, a first border region which is above a second border region (the first region being an upper border region and the second region being a lower border region) will be moved to a first corner region which is below a second corner region to which the second border region is moved (the first corner region being a lower corner region and the second corner region being an upper corner region). In the approach, a vertical direction from the first border region to the second border region is opposite a vertical direction from the first corner region to the second corner region.

In many embodiments, such as those described above, a first and second corner region may comprise pixel data derived from respectively a first and second border region in the first image property pixel structure where the two border regions are proximal to the same upper or lower border (i.e. both border regions are at the upper border or at the lower border). For example, the two border regions may be region p1 and p2 (or p3 and p4) of the figures. The two border regions are horizontally displaced with respect to each other, and specifically the whole of one of the regions may be completely to the right of the whole of the other region. Thus, the two border regions may be on different sides of a virtual vertical line, which specifically may be a center line of the first image property pixel structure. In the example of the figures, this virtual vertical line is a center line (i.e. p1 and p2 are on different sides of a vertical center line, as are p3 and p4).

Figure 5:
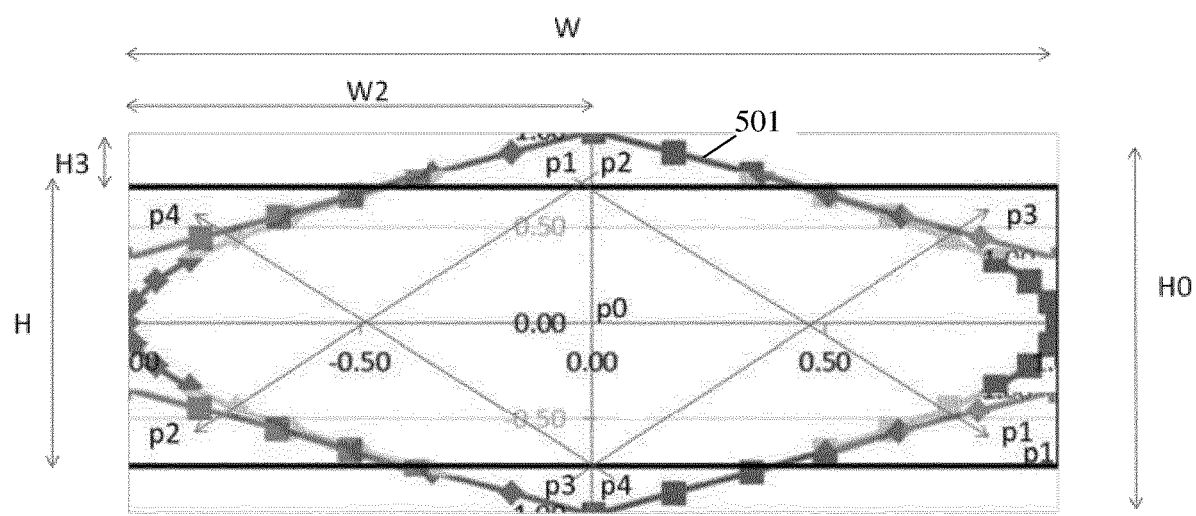
FIG. 5 illustrates an example of a mapping from a sine projection of spherical image for a view sphere to a rectangular image representing the view sphere in accordance with some embodiments of the invention.

In the specific examples of FIGS. 5-7, the virtual vertical line is a center line for the first image property pixel structure. Furthermore, in the example, the virtual vertical line is a line that separates the first and second border regions. Indeed, the first and second border regions together form a contiguous region which is subdivided into the first and second border regions by the virtual vertical line. Further, in the specific example, the first and second border regions are mirror symmetric around the virtual vertical line. In the example, an upper (and/or) lower border region is identified as a region above (or below) a given vertical coordinate (and thus above (or below) a given horizontal line corresponding to this horizontal line. This region is thus divided into two corresponding regions by a vertical center line. In the specific example, this results in two identical but mirror symmetric border regions.

Further, in the specific example, both upper and lower border regions are identified, and these are mirror symmetric relative to a horizontal center line. Specifically, in the example, four border regions are found with these being pairwise mirror symmetric around a horizontal and vertical center line.

The separation of the first image property pixel structure into such horizontally and/or vertically displaced and separated regions may in many embodiments provide for efficient and advantageous division that allows a relatively low complexity yet efficient reorganization in the second image property pixel structure with a reduced amount of non-used parts of the second image property pixel structure and thus with reduced overhead/waste. As described above, the two border regions may in many embodiments be linked to corner regions such that the horizontal order is reversed and/or the vertical order is reversed, but it will be appreciated that this is not essential and that some embodiments may not employ such reversal(s).

Specifically, the approach allows for an efficient rectangular and planar image structure to be generated which allows a uniform resolution to be maintained without requiring a large overhead for the rectangular representation.

In many embodiments, the first image property pixel has a uniform resolution for the surface (or the part of the surface) of the view sphere. Thus, the resolution of the view sphere is the same in all directions and all directions are represented with the same quality. The transformation of the first image property pixel structure into a second image property pixel structure which is rectangular can be performed by a direct rearrangement of the pixels and thus the pixel resolution is unchanged. In contrast to an ERP or cube map format, the described approach generates a rectangular image for which the resolution of the view sphere is unchanged and thus also represents a uniform resolution of the view sphere. Further, this is achieved with only a small overhead and increase in number of pixels.

A particular advantage of the described approach is that it provides an approach where the border regions fit tightly within the selected border regions. The border regions have a shape and outline that closely match the corner regions which remain after copying the central section into the second image property pixel structure. Further, the allocation of border regions to corner regions is in the specific example such that the shapes match each other without introducing any additional operations (specifically only a translation/shift is required).

In many embodiments, the pixels of the first image property pixel structure may be mapped directly to pixels of the second image property pixel structure, and specifically each pixel in the second image property pixel structure may be a copy of a pixel in the first image property pixel structure. The processing of the second processor 305 may accordingly be seen as a mapping of pixels (pixel positions) in the first image property pixel structure to pixels (pixel positions) in the second image property pixel structure. However, it will be appreciated that in some embodiments, the second processor 305 may also include some processing of the pixel values, for example the process may include a brightness adjustment, a depth adjustment, a filtering etc.

In the illustrated examples, the corner regions are populated by a direct shift/offset/translation of the border regions. The internal spatial relationship between pixels in each of the border regions is maintained in the corner regions.

However, in other embodiments, the second processor 305 may alternatively or additionally be arranged to include e.g. a mirroring and/or a rotation of a border region. This may specifically ensure a closer fit between the shape of the border region and the shape of a corner region in which the border region is positioned.

This may for example be used to apply a different mapping between border regions and corner regions. For example, rather than link border regions to diagonally opposite corner regions (i.e. top left border region to lower right corner region), a given border region may be mapped to the proximal corner region and a rotation (and/or mirroring) may be used to fit the shape of the border region to that of the corner region. For example, in the example of the figures, the top left border region p1 may be rotated 180° and shifted to the top-left corner region. Thus, a rotation may be performed such that a central part of the border region becomes a lateral part.

Such approaches using translations and/or mirroring rather than just translation may in particular be advantageous in many embodiments where only a part of the view sphere is represented by the first and second image property pixel structures. For example, in an example where only the upper half of the view sphere is represented (corresponding to only the upper half of the images of the exemplary figures), the two border regions p1 and p2 can be fitted into the two corner regions. For example, p1 and p2 can be fitted into respectively the upper left and upper right corner regions following a 180° rotation, or the into respectively the upper right and the upper left corner regions, following a mirroring around a horizontal line.

In some embodiments, the first processor 201 is arranged to receive a representation of the surface of the view sphere as an image property pixel structure which represents the surface by an equirectangular projection. For example, the first processor 201 may receive a representation such as that illustrated in FIG. 2.

The first processor 201 may in such embodiments be arranged to warp such a rectangular image property pixel structure into a non-rectangular image property pixel structure which can then be processed as the first image property pixel structure as described above. The first processor 201 may in such an embodiment specifically be arranged to transform the received image property pixel structure from being an equirectangular projection to an image property pixel structure which corresponds to a sinusoidal projection.

The first processor 201 may for example be arranged to do this by translation of coordinates according a cosine warping. An example for implementation in matlab may be as follows:

```
W0=4000
H0=2000
W=W0*4
W2=W/2
H=H0
H2=H/2
AA=imread('in1.png');
BB=zeros(size(AA));
for x = 1:W
for y = 1:H
sc=abs(cos(3.14/2*(y-H2)/H2));
%sc=0;
x1=x-W2;
i=floor(x1*sc)+W2;
BB(y,x,1)=AA(y,i,1);
BB(y,x,2)=AA(y,i,2);
BB(y,x,3)=AA(y,i,3);
end
end
imwrite(uint8([BB]),['out.png']);
```

In the previous examples, a second image property pixel structure is generated comprising central region and one or more corner region generated from respectively a central region and one or more border regions of the first image property pixel structure. The approach may specifically exploit the geometric properties of the first image property pixel structure to generate a central region and border regions such that the corner regions resulting from populating the central region of the second image property pixel structure from the central region of the first image property pixel structure have geometric properties (specifically shapes) that relatively closely match the geometric properties (specifically shapes) of the border regions. This allows an arrangement in which the entire first image property pixel structure is tightly positioned within non-overlapping central and corner regions with only small gaps. Thus, an effective representation is achieved with only a small number of pixels of the second image property pixel structure not representing pixels of the first image property pixel structure.

This is illustrated in FIG. 7 by black pixels between the corner regions and the central regions. As can be seen, the approach can exploit the geometries of the first image property pixel structure, to ensure an effective rectangular representation with only a few additional pixels in the rectangular representation with respect to the non-rectangular representation of the first image property pixel structure. In the example of a sinusoidal projection such as that of FIG. 4, the rectangular representation can be generated with an increase of only 5% in the number of pixels.

The second image property pixel structure is thus generated with one or more unfilled regions which however is kept to quite small areas. The small overhead (e.g. in comparison to an ERP or cube map representation) results in a reduced pixel count for the image property pixel structure which may substantially reduce the encoded data rate.

In some embodiments, the second processor 305 may further be arranged to perform an infilling of one or more of the unfilled regions. The infilling may specifically be performed by generating pixel values for pixels of the unfilled region(s) based on the pixel values of proximal pixels in the regions that have been populated, and specifically based on pixel values of the central region and on pixel values for pixels of the nearest corner region which have been populated from the first image property pixel structure.

In many embodiments, one or more pixel values generated from the first image property pixel structure may be extrapolated into the unfilled region(s). It will be appreciated that a number of techniques of infilling are known from de-occlusion processes being part of view synthesis techniques and that any such suitable algorithm can be used.

In some embodiments, this infilling may be performed by generating an intermediate image property pixel structure from the first image property pixel structure where the first image property pixel structure is extrapolated into surrounding regions. In this example, rather than just moving the border regions of the first image property pixel structure to the corner regions of the second image property pixel structure (resulting in unfilled regions when the shape of the border regions do not match the shape of the corner regions directly), regions of the intermediate image that correspond to the unfilled regions are also moved thereby filling in the unfilled regions.

Figure 8:
FIG. 8 illustrates an example of a rectangular image representing a view sphere in accordance with some embodiments of the invention.

FIG. 8 shows an example of an intermediate image generated by extrapolating the first image property pixel structure into a rectangular image. The second processor 305 may then generate the second image property pixel structure by copying the central region to the central region of the second image property pixel structure, and a region for each border region to the corner region of the second image property pixel structure but with the shape the copied regions being selected to exactly match the shape of the corner regions.

An advantage of an approach of infilling the regions is that it provides a second image property pixel structure which tends to have more consistent pixel values with less variation across the divisions between the different regions. This may result in a more efficient encoding resulting in a reduced data rate for a given quality level.

The examples above have focused on the processing of a single image. However, it will be appreciated that the approach can equally be applied to a plurality of images such as to individual frames of a video sequence.

Figure 9:
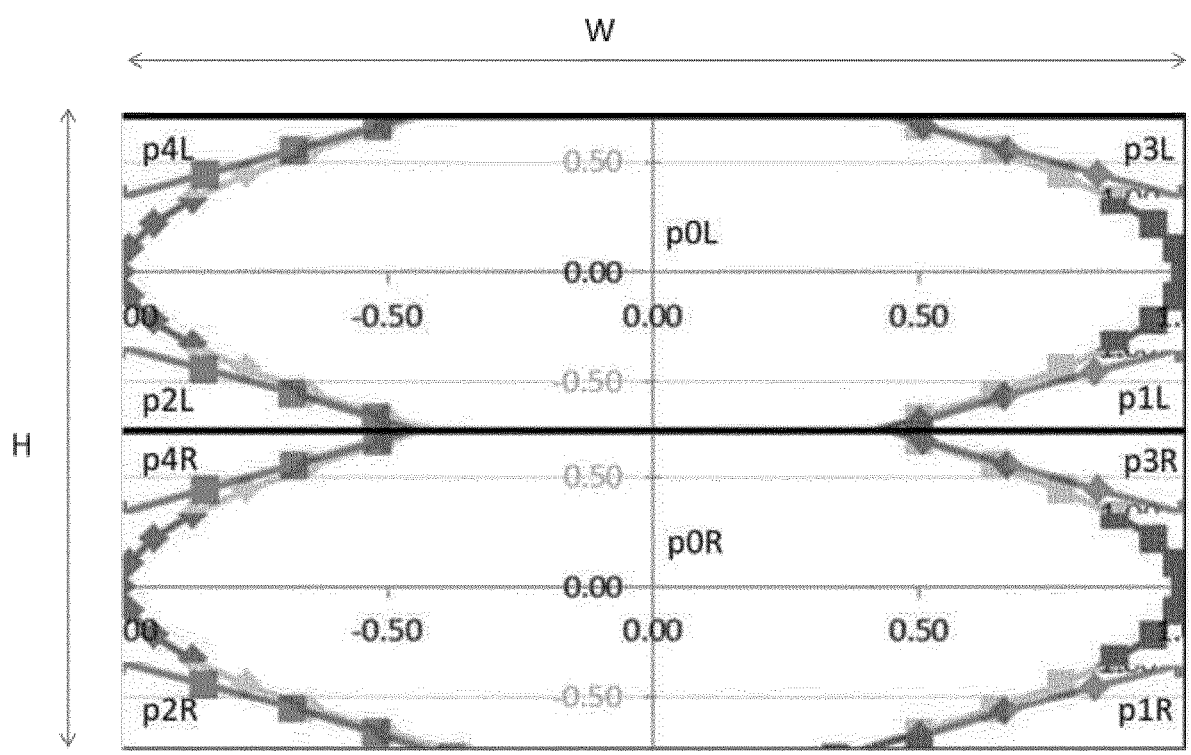
FIG. 9 illustrates an example of a rectangular image representing two view sphere in accordance with some embodiments of the invention.

Also, in some embodiments, the approach may be applied to parallel images, such as for example to the left and right eye images of a stereo image representation of a scene. In such a case, the second processor 305 may generate two rectangular image property pixel structures which may then be encoded. In some embodiments, the rectangular image property pixel structures may be combined prior to encoding. For example, as illustrated in FIG. 9, a single rectangular image property pixel structure may be generated by juxtaposing two individual image property pixel structure generated by the second processor 305 and the resulting overall image may be encoded as a single image.

The apparatus described above may accordingly generate a very efficient in image signal comprising the described second image property pixel structure. In some embodiments, the image signal may be an un-encoded image signal (e.g. corresponding to the output of the second processor 305 in the example of FIG. 3) but will in many embodiments be an encoded image signal (e.g. corresponding to the output of the encoder 307 in the example of FIG. 3).

It will be appreciated that a sink/client/decoder side may receive an image signal comprising a second image property pixel structure as described in the previous examples and process this to recreate an image property pixel structure corresponding to the original first image property pixel structure, i.e. corresponding to the non-rectangular representation of the view sphere.

Figure 10:
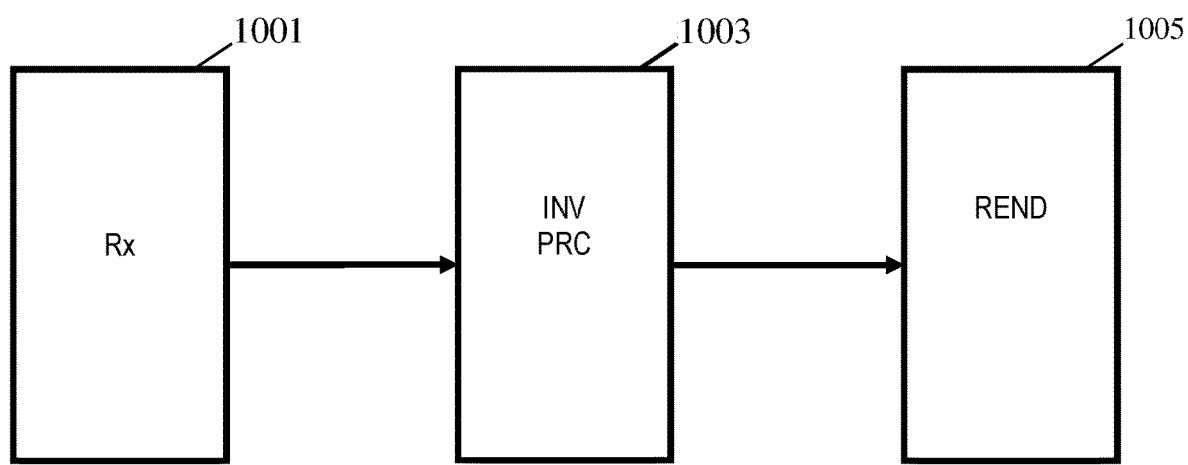
FIG. 10 illustrates an example of elements of an apparatus in accordance with some embodiments of the invention.

An example of such an apparatus is shown in FIG. 10. The apparatus comprises a receiver 1001 which is arranged to receive an image signal comprising an image representation of a scene in the form of an image property pixel structure representing a view sphere from a given view point as described for the second image property pixel structure.

This second image property pixel structure is fed to an inversion processor 1003 which is arranged to generate a non-rectangular image property pixel structure by performing the opposite operation of the that performed by the second processor of FIG. 3. Specifically, it may perform the inverse pixel (position) mapping such that the central region of the received second image property pixel structure is mapped to a central part of the generated image property pixel structure, and the corner region(s) of the second image property pixel structure are mapped to the border regions of the generated image property pixel structure.

This locally generated non-rectangular image property pixel structure may then be output to other functions for further processing. For example, in FIG. 10, the generated image property pixel structure is fed to a local renderer which may proceed to synthesize view images corresponding to a current viewer pose as will be known to the skilled person.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. An apparatus, comprising:
a first processor circuit,
wherein the first processor circuit is arranged to provide a first image property pixel structure,
wherein the first image property pixel structure represents a property of a scene from a viewpoint,
wherein the first image property pixel structure is a first two-dimensional non-rectangular pixel structure,
wherein the first two-dimensional non-rectangular pixel structure represents at least part of a surface of a view sphere for the viewpoint; and
a second processor circuit,
wherein the second processor circuit is arranged to generate a second image property pixel structure,
wherein the second image property pixel structure is a second two dimensional rectangular pixel structure,
wherein the second image property pixel structure has a second central region derived from a first central region,
wherein the first central region is a central region of the first image property pixel structure,
wherein the second image property pixel structure has a first corner region,
wherein the first corner region is derived from a first border region of the first image property pixel structure,
wherein the first border region is a region proximal to an upper border of the first image property pixel structure,
wherein the second image property pixel structure has a second corner region,
wherein the second corner region is derived from a second border region of the first image property pixel structure,
wherein the second border region is a region proximal to a lower border of the first image property pixel structure,
wherein the first one corner region and the second corner region are non-overlapping with the second central region,
wherein the first central region is restricted by an upper horizontal line and a lower horizontal line,
wherein the upper horizontal line corresponds to an upper edge of the second image property pixel structure,
wherein the lower horizontal line corresponds to a lower edge of the second image property pixel structure,
wherein the first border region of the first image property pixel structure is more peripheral than the upper horizontal line,
wherein the second border region is more peripheral than the lower horizontal line.

2. The apparatus of claim 1, wherein the first image property pixel structure has a uniform resolution for at least part of the surface of the view sphere.

3. The apparatus of claim 1, wherein the first central region and the first border region are non-overlapping.

4. The apparatus of claim 1,
wherein the second processor circuit is arranged to generate the second image property pixel structure such that a third corner region is derived from a third border region of the first image property pixel structure,
wherein the third corner region is non-overlapping with the second central region,
wherein the third border region is a region proximal to the upper border,
wherein the first border region and the third border region are on different sides of a virtual vertical line of the first image property pixel structure.

5. The apparatus of claim 4,
wherein the virtual vertical line separates the first border region from the third border region,
wherein the first border region and the third border region are mirror symmetric around the virtual vertical line.

6. The apparatus of claim 4, wherein a horizontal direction from the first border region to the third border region is opposite a horizontal direction from the first corner region to the third corner region.

7. The apparatus of claim 1, wherein the first corner region is proximal to an opposite border of the first border region.

8. The apparatus of claim 1,
wherein the second processor circuit is arranged to extrapolate pixels of at least one of the first corner region and the second central region into an unfilled region of the second image property pixel structure,
wherein the unfilled region of the second image property pixel structure is proximal to at least one of the first corner region and the second central region.

9. The apparatus of claim 1, wherein the second processor circuit is arranged to determine pixel values of the first corner region by at least one of a shifting, translation, mirroring and rotation of pixel values of the first border region.

10. The apparatus of claim 1,
wherein the first processor is arranged to generate the first image property pixel structure by warping a rectangular image property pixel structure by an equirectangular projection,
wherein the rectangular image property pixel structure represents at least part of the surface of the view sphere.

11. The apparatus of claim 1, wherein the first image property pixel structure is a depth map.

12. The apparatus of claim 1, wherein the first image property pixel structure is a light intensity image.

13. An apparatus, comprising:
a receiver circuit,
wherein the receiver circuit is arranged to receive an image signal,
wherein the image signal comprises a second image property pixel structure,
wherein the second image property pixel structure is a two dimensional rectangular pixel structure,
wherein the second image property pixel structure has g-a second central region, and at least a first corner region and a second corner region,
wherein the second central region is derived from a first central region,
wherein the first central region is a central region of a first image property pixel structure,
wherein the first corner region is derived from a first border region of the first image property pixel structure,
wherein the first image property pixel structure is a two-dimensional non-rectangular pixel structure,
wherein the first image property pixel structure represents at least part of a surface of a view sphere for a viewpoint,
wherein the first border region is a region proximal to an upper border of the first image property pixel structure,
wherein the second corner region is derived from a second border region of the first image property pixel structure,
wherein the second border region is a region proximal to a lower border of the first image property pixel structure,
wherein the first corner region and the second corner region are non-overlapping with the second central region,
wherein the first central region is restricted by an upper horizontal line and a lower horizontal line,
wherein the upper horizontal line corresponds to an upper edge of the second image property pixel structure,
wherein the lower horizontal line corresponds to a lower edge of the second image property pixel structure,
wherein the first border region of the first image property pixel structure is more peripheral than the upper horizontal line,
wherein the second border region is more peripheral than the lower horizontal line; and
a processor circuit,
wherein the processor circuit is arranged to generate a non-rectangular output image property pixel structure,
wherein the non-rectangular output image property pixel structure represents the at least part of the surface of the view sphere for the viewpoint,
wherein the non-rectangular output image property pixel structure has a central region and first and second border regions,
wherein the central region of the non-rectangular output image property pixel structure is derived from the second central region,
wherein the first border region of the non-rectangular output image property pixel structure is a region proximal to an upper border of the non-rectangular output image property pixel structure,
wherein the second border region of the non-rectangular output image property pixel structure is a region proximal to lower border of the non-rectangular output image property pixel structure,
wherein the first border region of the non-rectangular output image property pixel structure is derived from the first corner region of the second image property pixel structure,
wherein the second border region of the non-rectangular output image property pixel structure is derived from the second corner region of the second image property pixel structure.

14. A method, comprising:
providing a first image property pixel structure,
wherein the first image property pixel structure represents a property of a scene from a viewpoint,
wherein the first image property pixel structure is a two-dimensional non-rectangular pixel structure,
wherein the first image property pixel structure represents at least part of a surface of a view sphere for the viewpoint; and
generating a second image property pixel structure,
wherein the second image property pixel structure is a two dimensional rectangular pixel structure,
wherein the second image property pixel structure has a second central region and at least a first corner region and a second corner region,
wherein the second central region is derived from a first central region,
wherein the first central region is a central region of the first image property pixel structure,
wherein the first corner region is derived from a first border region of the first image property pixel structure,
wherein the first border region is a region proximal to an upper border of the first image property pixel structure,
wherein the second corner region is derived from a second border region of the first image property pixel structure,
wherein the second border region is a region proximal to a lower border of the first image property pixel structure,
wherein the first corner region and the second corner region are non-overlapping with the second central region,
wherein the first central region is restricted by an upper horizontal line and a lower horizontal line,
wherein the upper horizontal line corresponds to an upper edge of the second image property pixel structure,
wherein the lower horizontal line corresponds to a lower edge of the second image property pixel structure, wherein the first border region of the first image property pixel structure is more peripheral than the upper horizontal line, wherein the second border region of the first image property pixel structure is more peripheral than the lower horizontal line.

15. A method, comprising:

receiving an image signal, wherein the image signal comprises a second image property pixel structure, wherein the second image property pixel structure is a two dimensional rectangular pixel structure, wherein the second image property pixel structure has g-a second central region and at least a first corner region and a second corner region, wherein the second central region is derived from a first central region, wherein the first central region is a central region of a first image property pixel structure, wherein the first corner region is derived from a first border region of the first image property pixel structure, wherein the first image property pixel structure is a two-dimensional non-rectangular pixel structure, wherein the first image property pixel structure represents at least part of a surface of a view sphere for a viewpoint, wherein the first border region is a region proximal to an upper border of the first image property pixel structure, wherein the second corner region is derived from a second border region of the first image property pixel structure, wherein the second border region is a region proximal to a lower border of the first image property pixel structure, wherein the first corner region and the second corner region are non-overlapping with the second central region, wherein the first central region is restricted by an upper horizontal line and a lower horizontal line, wherein the upper horizontal line corresponds to an upper edge of the second image property pixel structure, wherein the lower horizontal line corresponds to a lower edge of the second image property pixel structure, wherein the first border region of the first image property pixel structure is more peripheral than the upper horizontal line, wherein the second border region of the first image property pixel structure is more peripheral than the lower horizontal line; and generating a non-rectangular output image property pixel structure, wherein the non-rectangular output image property pixel structure represents the at least part of the surface of the view sphere for the viewpoint, wherein the non-rectangular output image property pixel structure has a central region and a first border region and a second border region, wherein the central region of the non-rectangular output image property pixel structure is derived from the second central region, wherein the first border region of the non-rectangular output image property pixel structure is a region proximal to an upper border of the output image property pixel structure, wherein the second border region of the non-rectangular output image property pixel structure is proximal to a lower border of the output image property pixel structure, wherein the first border region of the non-rectangular output image property pixel structure is derived from the first corner region of the second image property pixel structure, wherein the second border region of the non-rectangular output image property pixel structure is derived from the second corner region of the second image property pixel structure.

16. A non-transitory storage medium, wherein the non-transitory storage medium stores a computer program, wherein the computer program when executed on a processor performs the method as claimed in claim 14.

17. A non-transitory storage medium, wherein the non-transitory storage medium stores a computer program, wherein the computer program when executed on a processor performs the method as claimed in claim 15.

18. The method of claim 14, wherein the first image property pixel structure has a uniform resolution for at least part of the surface of the view sphere.

19. The method of claim 15, wherein the first image property pixel structure has a uniform resolution for at least part of the surface of the view sphere.

20. The apparatus of claim 14, wherein the first central region and the first border region are non-overlapping.

* * * * *